United States Patent [19]

Takayanagi

[11] Patent Number: 4,714,453
[45] Date of Patent: Dec. 22, 1987

[54] DRIVE CHAIN ADJUSTMENT MECHANISM FOR VEHICLES HAVING TWO REAR WHEELS

[75] Inventor: Shinji Takayanagi, Wako, Japan

[73] Assignee: Honda Giken Kogyo Kabushiki Kaisha, Tokyo, Japan

[21] Appl. No.: 865,691

[22] Filed: May 22, 1986

[30] Foreign Application Priority Data

May 23, 1985 [JP] Japan .............................. 60-76850[U]

[51] Int. Cl.⁴ .............................................. F16H 7/10
[52] U.S. Cl. ..................................... 474/112; 474/128
[58] Field of Search ............... 474/112, 122, 128, 130, 474/119, 116; 180/217; 188/18 R

[56] References Cited

U.S. PATENT DOCUMENTS 1,348,022 7/1920 McAvoy ............................. 474/112
4,541,502 9/1985 Iwai et al. ....................... 474/112 X Primary Examiner—Stephen J. Novosad
Assistant Examiner—Thuy M. Bui
Attorney, Agent, or Firm—Armstrong, Nikaido, Marmelstein & Kubovcik

[57] ABSTRACT

A drive chain adjustment mechanism for a vehicle having two rear wheels includes a swing arm supported on a body frame for vertically pivotal movement, a pipe member fixed to the rear end thereof, and a holder member inserted into the pipe member, which has therethrough an eccentric bore for rotatably supporting a rear wheel axle driven by way of a drive chain. The holder member is provided on at least one end with a plurality of projections, which are recessed to receive a rod-like tool and thereby turn the holder member.

2 Claims, 6 Drawing Figures

DRIVE CHAIN ADJUSTMENT MECHANISM FOR VEHICLES HAVING TWO REAR WHEELS

FIELD OF THE INVENTION AND RELATED ART STATEMENT

The present invention relates to a drive chain adjustment mechanism suitable for use with a vehicle having two rear wheels, in particular, a buggy type of three- or four-wheeled automobile.

In some cases, a mechanism for adjusting the degree of tension of a drive chain is provided to a vehicle of the type which drives two rear wheels by way of a drive chain and in which the two rear wheels are rotatably supported at the rear end of a swing arm, and the front end of the swing arm is mounted on a body frame by means of a pivot shaft for vertically pivotal movement.

One example of such a adjustment mechanism is disclosed in Japanese Utility Model Laid-Open Publication No. 58 (1983)-181,689.

The drive chain adjustment mechanism disclosed in this publication will now be explained with reference to FIG. 1, exploded perspective views of a swing arm, a holder member and a pin spanner, and FIG. 2, a side view of the rear portion of the swing arm.

As illustrated in FIGS. 1 and 2, a swing arm generally shown at 50 includes a pipe member 52 fixed to its rear end. In the pipe member 52, there is fitted a holder member 56 having therethrough an eccentric bore 54, the center O' of which is made eccentric with respect to the center O of the member 52 by alpha ($\alpha$). The pipe member 52 is provided on both ends with T-shaped slits 58 each defined by a diametrical slit and a radial slit. On the outer face of the member 52, bolt-clamping brackets 60 and 62 are provided with the radial slit being located therebetween. The holder member 56 is clamped and fixed to the pipe member 52 by means of bolts inserted into the brackets 60 and 62. For chain adjustment, the clamping bolts are loosened to support the holde rmember 56 in a turnable manner.

In the eccentric bore 54 of the holder member 56, there is rotatably inserted and supported an axle 66 for the rear wheels through bearings. For chain adjustment, the pipe member 52 is relaxed to turn the holder member 56 within the pipe member 52, so that the eccentric bore 54 and the axlw 66 are moved to-and-fro with respect to the body frame as one piece to adjust the degree of tension of the chain.

To turn the holder member 56 for that purpose, however, an end 74 of a specially designed tool, e.g., a pin spanner 62 of such a shape as illustrated in FIG. 1, is fitted into a plurality of grooves 70 formed in a flange 68 provided at one end of the holder member 56.

Thus, the prior art adjustment mechanism has a problem that it is impossible to make chain adjustment, in case the specially designed tool such as the pin spanner illustrated in FIG. 1 is unavailable.

When it is intended to turn the holder member in the opposite directions for, e.g., fine adjustment, the specially designed tool presents a problem in connection with workability, since it must be inserted into and pulled out of the holder member for each turning.

OBJECT AND SUMMARY OF THE INVENTION

An object of the prsent invention is to improve the structure of a portion of the aforesaid holder to engage a tool, thereby providing a drive chain adjustment mechanism which enables to turn the aforesaid holder member with the rod of a plug wrench or other rod-like tool such as a screw driver usually carried with a vehicle, and thus dispenses with any specially designed tool.

Another object of the present invention is to turn the holder member in the opposite directions, while it remains engaged therewith.

A further object of the present invention is to prevent the toolengaging portion from being clogged with mud, etc.

A still further ojbect of the present invention is to make cleaning of the tool engaging portion easy.

According to one aspect of the present invention, these objects are achieved by a drive chain adjustment mechanism for a vehicle having two rear wheels, which includes a swing arm pivotally mounted at its front end on a body frame; a pipe member fixed to the rear end of said swing arm; a holder member having therethrough an eccentric bore, said holder member being inserted into and clamped and fixed with said pipe member, and is rotatably supported in place during chain adjustment; and an axle for the rear wheels, rotatably inserted into said eccentric bore of said holder member; said holder member being provided on at least one end with a plurality of projections recessed to receive a tool for turning said holder member.

According to another aspect of the present invention, said recessions are open in the extreme ends of said projections.

According to a further aspect of the present invention, said recessions are open on their one sides.

According to a still further aspect of the present invention, said recessions have their bottoms inclined downwardly toward said one sides.

Many other advantages, features and additional object of this invention will become manifest to those versed in the art upon making reference to the detailed description and the accompanying sheet of the drawings on which preferred structural embodiments incorporating the principles of this invention are shown by way of illustrative examples.

BRIEF DESCRIPTION OF THE DRAWINGS

FIG. 6 is a sectional view taken along the line 6—6 of FIG. 5.

DETAILED DESCRIPTION OF PREFERRED EMBODIMENTS

The present invention will now be explained with reference to FIGS. 3 to 6 showing one embodiment thereof applied to a buggy type of threewheeled automobile.

Figure 3:
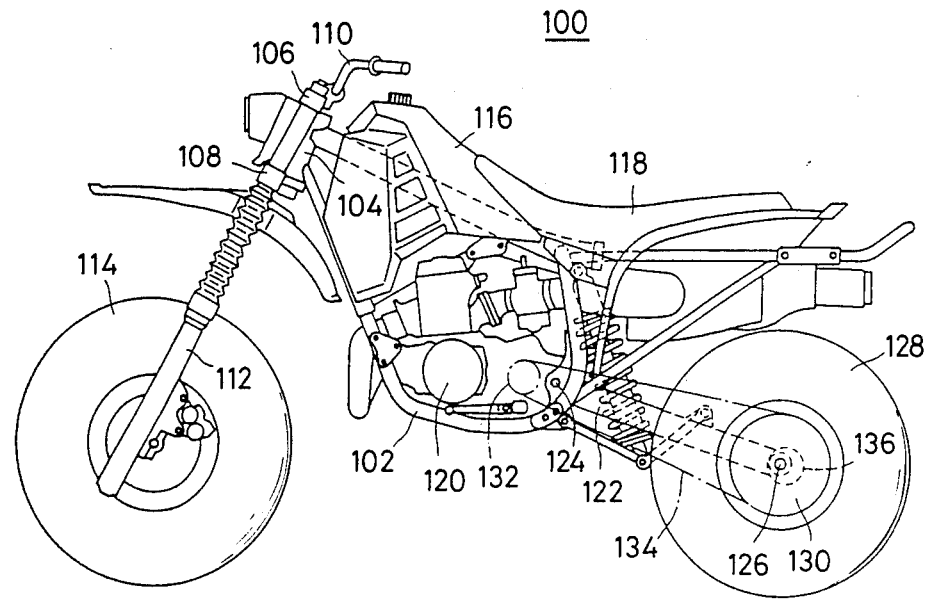
FIGS. 3 to 6 inclusive show one embodiment of the present invention, FIG. 3 being a general side view showing a three-wheeled automobile, FIG. 4 being a general plan view thereof, FIG. 5 being a partially sectioned plan view of a swing arm portion.
Figure 4:
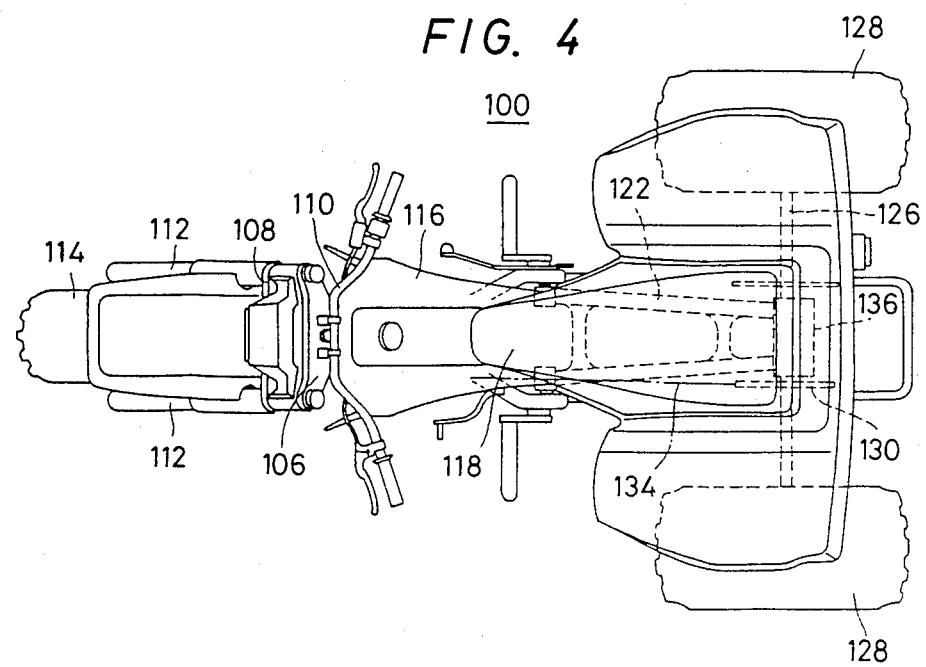

Referring now to FIGS. 3 and 4, a buggy type of three-wheeled automobile generally shown at 100 includes a body frame 102 fixed at its front end to a head pipe 104, into which is inserted a stem pipe 104 provided with top and bottom bridges 106 and 108. The top bride 106 is provided with a handlebar 110, and a front fork 112 is fixedly inserted at its upper portion in between both bridges 106 and 108. The front fork 112 is rotatably supported at its lower end with a front wheel 114 serving as a steering wheel.

On the body frame 102 in the rear of the head pipe 104, there is mounted a fuel tank 116, following which a set 118 is mounted. An engine 120 is mounted on the body frame 102 below the fuel tank 116.

Figure 5:
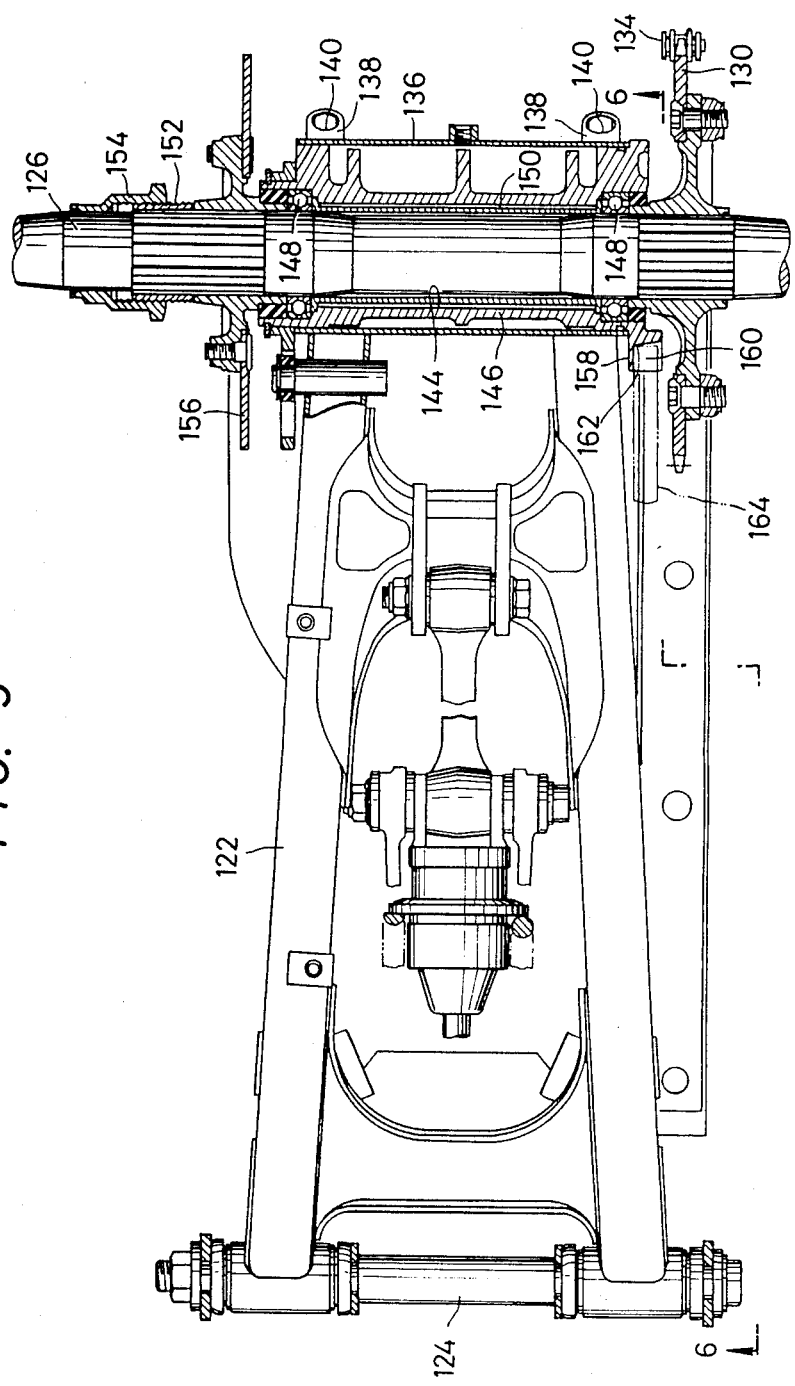
Figure 6:
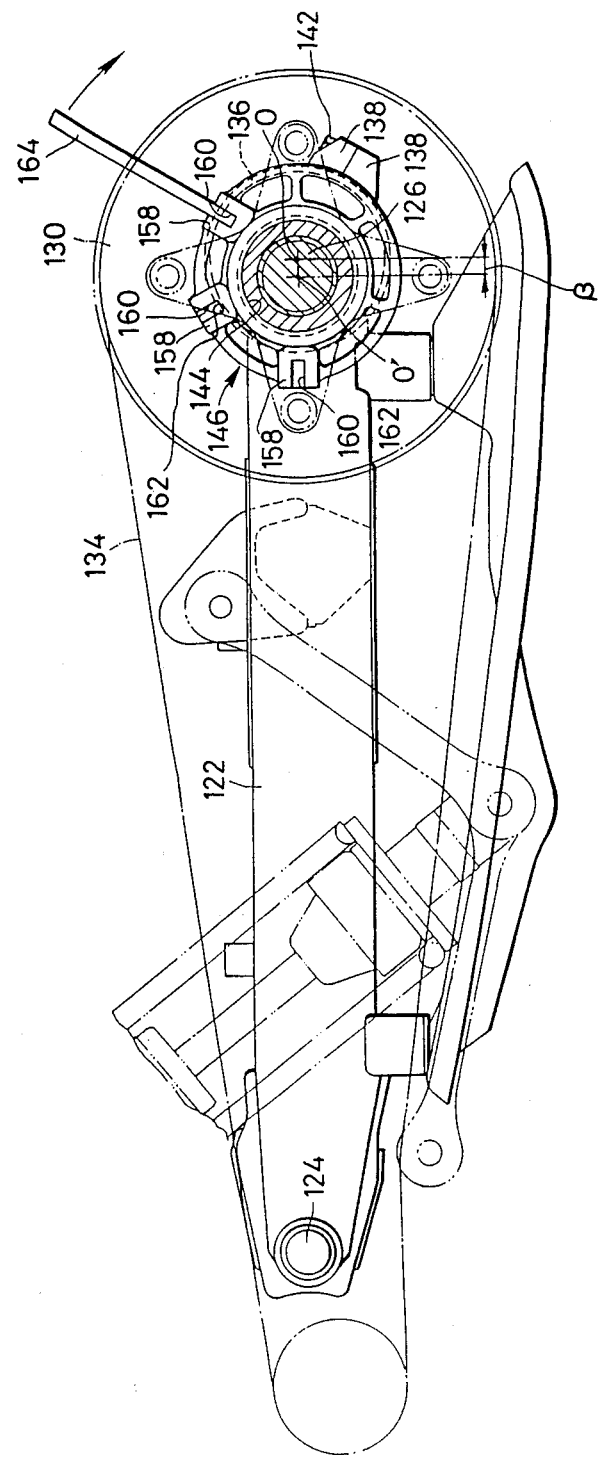

On the substantially central portion of the body frame 102, the front end of a swing arm 122, the details of which are shown in FIGS. 5 and 6, is supported by means of a pivot shaft 124 for vertically pivotal movement. An axle 126 for the rear wheel is rotatably inserted into the rear end of the swing arm 122, and includes at both ends rear wheels 128 and 128.

A driven sprocket 130 is fitted over the axlw 126, and a drive chain 134 is applied under tension between drive sprockets 132 of a smaller diameter, which are fitted over said driven sprocket 130 and an output shaft (not shown) of the engine 120.

Figure 1:
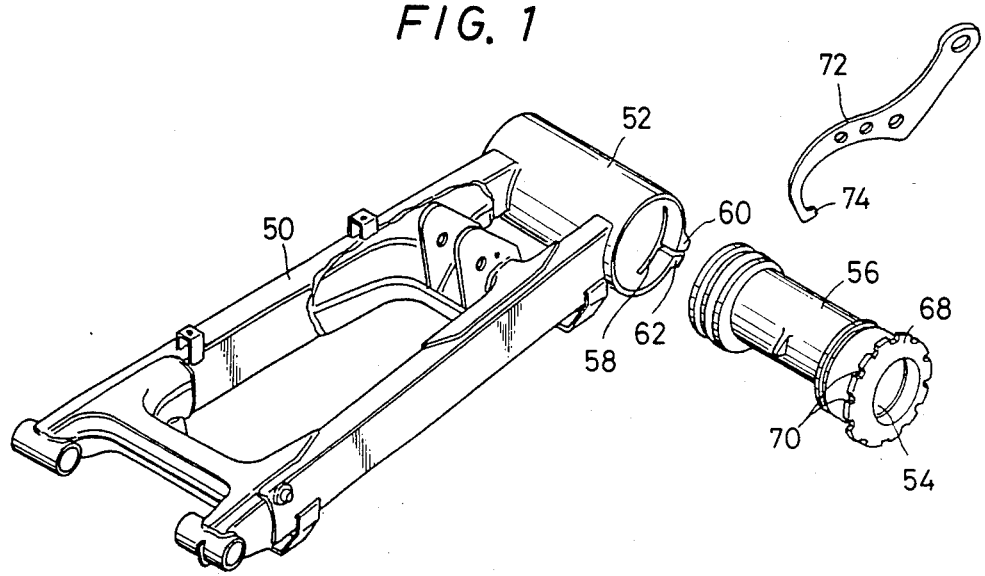
FIGS. 1 and 2 show one example of the conventional chain adjustment mechanism, FIG. 1 being an exploded perspective view of a swing arm, a holder member and a pin spanner, and FIG. 2 being a side view of the rear portion of that swing arm.
Figure 2:
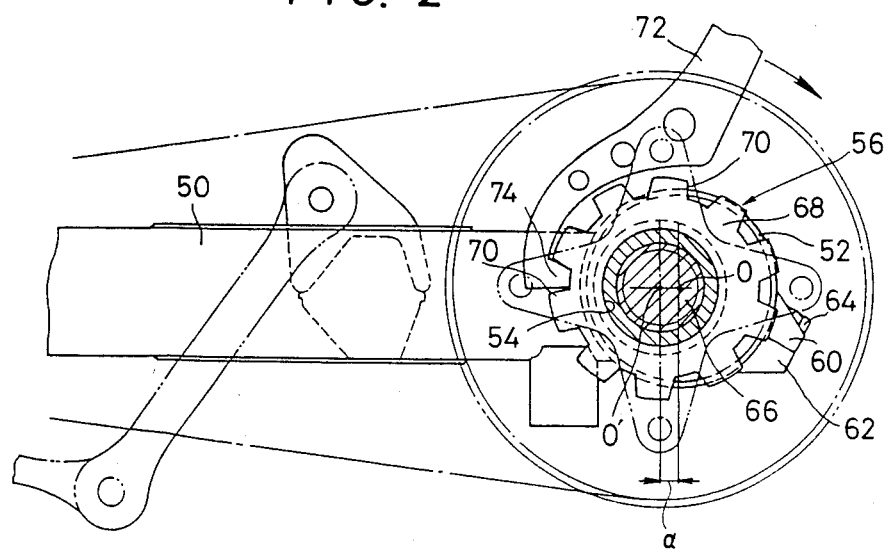

As illustrated in FIGS. 5 and 6, a pipe member 136 is fixedly provided at the rear end of the swing arm 122, and is provided at both its end edges with T-shaped slits similar to those shown in FIG. 1. On both edges of the member 136, there are provided bolt-clamping brackets 138 and 138 with the radial slits being located therebetween. The brackets 138 and 138 are provided therethrough with bores 140 through which clamping bolts 142 are threadedly inserted.

Through the pipe member 136, there is inserted a bearing holder member 146 having an eccentric bore 144, the center O' of which is made eccentric with respect to the center O of said member 136 by beta ($\beta$), as illustrated in FIG. 6. The holder member 146 is then tightly held on the pipe member 136 by clamping of the clamping bolts 142.

The aforesaid rear wheel axle 126 is inserted into the eccentric bore 144 in the holder member 146, and is rotatably supported with left and right bearings 148 and 148 fitted into the eccentric bore 144, as illustrated in FIG. 5. In FIG. 5, reference numerals 150, 152, 154 and 155 stand for a collar, a nut, a lock nut and a brake disk, respectively.

Three projections 158 are provided on the circumference of the end of the holder member 146, on the side of which the drive chain 134 is applied. Each of said projections 158 is recessed at 160 to receive a tool. The recession 160 may be in the form of a hole formed by boring the end of each projection 158. However, it is preferred that the recession is open on the side facing the sprocket 130 to prevent its clogging due to mud, etc., and it is further preferred that the recession has its bottom 162 inclined downwardly toward its open side to facilitate cleaning, as illustrated.

Adjustment of the degree of tension of the drive chain 134 is then achieved by engaging the rod of a plug wrench or the end of an easily available tool such as a rod-like tool 164, for instance, a screw driver within the recessions 160 and turning it in the direction shown by an arrow in FIG. 6, for instance.

Referring to FIG. 6 illustrating that the rear wheel axle 126 is located at its foremost position in the pipe member 136, when it is intended to move that axle rearwardly to increase the tension of the drive chain 134, the clamping bolts 142, by which the holder member 146 is now clamped in place, are loosened to make the holder member 146 turnable within the pipe member 136.

As the holder member 146 is then turned in the direction, e.g., shown by an arrow in FIG. 6 with the rod-like tool 164, the center O' of the eccentric bore 144 shifts rearwardly from the illustrated position, since it is made eccentric with respect to the center O of the pipe member 136 by beta ($\beta$). This causes that the rear wheel axle 126 concentrically inserted through said bore 144 and the driven sprocket 130 fitted over the axle 126 are retracted by the same amount. As a result, the space between the drive sprocket 132 and the driven sprocket 130 is increased, whereby the drive chain 134 is applied under the desired tension.

Thereafter, the clamping bolts 142 are again clamped to tightly secure the holder member 146 to the pipe member 136 for the completion of chain adjustment. When it is intended to make fine adjustment by turning the holder member 146 in the opposite directions during the aforesaid adjustment, the holder 146 can be turned without pulling the rod-like holder 164 out of the recessions 160. Thus, improvements are introduced into workability.

According to the embodiment of the present invention as mentioned above, the holder member 146 can easily be turned by fitting the rod-like tool 164 into the recessions 160 formed in the projections 158 of the holder 146 and turning it in the desired direction, so that chain adjustment can simply and efficiently be made with an available rod-like tool, even when any specially designed tool such as a pin spanner is unavailable.

The maximum amount of adjustment is obtained, when the holder member 146 is turned 180° from the position illustrated in FIG. 6 in either direction, and is expressed in terms of a value of two times as large as the eccentric amount of beta ($\beta$). Consequently, the amount of turning of the holder member may be within the range as mentioned just above. It is noted that the number of projections 158 to be formed on the holder member 146 is not limited to three. It is also understood that, while the aforesaid embodiment has been described as being applied to a three-wheeled automobile, the present invention is also applicable to other vehicles having two rear wheels, for instance, a chain-driven four-wheeled autmobile.

Obviously, many modifications and variations of the present invention are possible in the light of above teachings. It is therefore to be understood that within the scope of the appended claims, the invention may be practiced otherwise than as specifically described.

What is claimed is:

1. A drive chain adjustment mechanism for vehicle having two rear wheels, which includes:
    a swing arm pivotally mounted at its front end on a body frame;
    a pipe member fixed to the rear end of said swing arm;
    a holder member having therethrough an eccentric bore, said holder member being inserted into and clamped and fixed with said pipe member, and being rotatably supported in place during chain adjustment;
    an axle for the rear wheels, rotatably inserted into said eccentric bore in said holder member; and
    a driven sprocket mounted between one end of said holder member and one of said two rear wheels and fitted over said axle, said holder member being provided at said one end with a plurality of projections having recessions to receive a tool for turning said holder member, each said recession opening through the extremem end and on one side of its respective projection.

2. The mechanism as defined in claim 1, wherein each said recession has a bottom inclined downwardly toward said one open side thereof.

* * * * *